(12) United States Patent
Miyadai et al.

(10) Patent No.: US 6,582,620 B2
(45) Date of Patent: Jun. 24, 2003

(54) WATER-SOLUBLE, WATER/OIL REPELLENT TREATING COMPOSITION AND METHOD OF MAKING

(75) Inventors: Shinji Miyadai, Gunma-ken (JP); Kazuyuki Matsumura, Gunma-ken (JP); Akira Yamamoto, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/020,985

(22) Filed: Dec. 19, 2001

(65) Prior Publication Data

US 2002/0132952 A1 Sep. 19, 2002

(30) Foreign Application Priority Data

Dec. 22, 2000 (JP) ........................................ 2000-390204

(51) Int. Cl.⁷ ..................... D06M 15/643; C08G 77/24; C08G 77/26
(52) U.S. Cl. .................... 252/8.62; 252/8.61; 252/8.63; 8/115.64; 524/588; 524/837; 524/838; 528/33; 528/34; 528/36; 528/38
(58) Field of Search ............................... 528/33, 34, 36, 528/38; 524/588, 837, 838; 252/8.61, 8.62, 8.63; 8/115.64

(56) References Cited

U.S. PATENT DOCUMENTS

| 4,996,280 | A | | 2/1991 | Saho et al. | |
|---|---|---|---|---|---|
| 5,442,011 | A | | 8/1995 | Halling | |
| 5,599,893 | A | * | 2/1997 | Asai et al. | 528/12 |
| 5,739,369 | A | * | 4/1998 | Matsumura et al. | 556/425 |
| 5,808,125 | A | | 9/1998 | Standke et al. | |
| 5,883,185 | A | | 3/1999 | Matsumura et al. | |
| 6,054,601 | A | | 4/2000 | Standke et al. | |
| 6,271,293 | B1 | * | 8/2001 | Karuga et al. | 524/265 |
| 6,288,256 | B1 | | 9/2001 | Standke et al. | |

FOREIGN PATENT DOCUMENTS

| EP | 0 353 709 | 2/1990 |
|---|---|---|
| JP | 2960304 | 4/1995 |
| JP | 09249748 A | 9/1997 |
| WO | WO 95/23830 | 9/1995 |

* cited by examiner

*Primary Examiner*—Robert Dawson
*Assistant Examiner*—Jeffrey B. Robertson
(74) *Attorney, Agent, or Firm*—Birch, Stewart, Kolasch & Birch, LLP

(57) ABSTRACT

The reaction product obtained by cohydrolysis and condensation of (A) a fluorinated alkyl-bearing alkoxysilane, (B) an amino-bearing alkoxysilane, and (C) an alkoxysilyl-bearing polyorganosiloxane is dissolved in water to provide a water-soluble, water/oil repellent treating composition. This water/oil repellent treating composition has improved water solubility and shelf stability, has no detrimental effects on the environment because of the aqueous system, and imparts fully durable water repellency and satisfactory softness and hand to textiles.

4 Claims, No Drawings

WATER-SOLUBLE, WATER/OIL REPELLENT TREATING COMPOSITION AND METHOD OF MAKING

This invention relates to a water-soluble, water/oil repellent treating composition which is used to treat substrates, especially fibrous items such as clothes, non-woven fabrics, rainwear, carpets, sofas, leather and paper, to impart all of water/oil repellency, stain proofing and softness thereto, and a method for preparing the same. More particularly, it relates to such a water-soluble, water/oil repellent treating composition with which substrates can be treated in a simple manner without detrimental influence on the environment.

BACKGROUND OF THE INVENTION

Water repellent sprays are one class of convenient commodity capable of imparting water repellency to fibrous items including clothes and leather. Typical water repellent sprays use fluoro-resins as the repellent. The solvent in which the repellent is dissolved has been switched from fluorocarbons to petroleum hydrocarbon solvents since environmental problems including ozone layer protection recently became of great concern. However, the petroleum hydrocarbon solvents often give rise to problems like intoxication accidents of ordinary consumers. It would be desirable from the health and environment factors to have a safer water repellent spray which does not use organic solvents.

From this standpoint, Japanese Patent No. 2,960,304 proposes a repellent composition comprising a silicone acrylic graft copolymer as a base component and an alcoholic solvent. This composition, however, is not so water repellent as the fluoro-resin systems and cannot impart oil repellency. The solvent which is alcohol is low toxic, but is not completely odorless. Among aqueous systems, those of fluorinated acrylic polymer emulsion type are often used. This emulsion has the problems that unreacted toxic monomer is often left after polymerization, and fibers treated therewith are less soft.

The inventors proposed in JP-A 9-249748 a fiber or fabric treating agent which is water soluble, fully water/oil repellent and low yellowing. Regrettably, when fibrous items are treated therewith, the softness which is requisite to fibrous items is sometimes impaired.

SUMMARY OF THE INVENTION

Therefore, an object of the invention is to provide a water-soluble, water/oil repellent treating composition which is dissolvable in water to clear the safety requirement, and possesses water/oil repellency, stain proofing, softness, and storage stability.

It has been found that when the reaction product obtained by cohydrolysis and condensation of (A) a fluorinated alkyl-bearing alkoxysilane of the general formula (1) and/or a partial hydrolyzate thereof, (B) an amino-bearing alkoxysilane of the general formula (2) and/or a partial hydrolyzate thereof, and (C) an alkoxysilyl-bearing polyorganosiloxane of the general formula (3) and/or a partial hydrolyzate thereof is used as an active ingredient in a water/oil repellent treating composition (the formulae are defined below), there is obtained a water-soluble, water/oil repellent treating composition. The reaction product is readily dissolvable in water because the fluorinated alkyl-bearing silane compound serving as a water repellent component itself is endowed with water solubility. The composition remains stable during shelf storage and imparts high water repellency, which remains durable after treatment. The alkoxysilyl-bearing polyorganosiloxane can impart softness inherent to silicone. After treatment with the composition, fiber surfaces are endowed with water/oil repellency and softness. The inventive composition overcomes the problems of prior art water/oil repellent agents. It has also been found that the cohydrolytic condensation reaction product can be prepared in a consistent and reliable manner by effecting (partial) cohydrolysis on components (A) and (C) to form a (partial) cohydrolysate, and effecting condensation reaction of the (partial) cohydrolysate with component (B).

According to one aspect, the invention provides a water-soluble, water/oil repellent treating composition comprising the reaction product obtained by cohydrolysis and condensation of (A) a fluorinated alkyl-bearing alkoxysilane of the following general formula (1) and/or a partial hydrolyzate thereof, (B) an amino-bearing alkoxysilane of the following general formula (2) and/or a partial hydrolyzate thereof, and (C) an alkoxysilyl-bearing polyorganosiloxane of the following general formula (3) and/or a partial hydrolyzate thereof, the reaction product being dissolved in water.

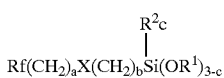

Herein Rf is a perfluoroalkyl group represented by $C_nF_{2n+1}$ or a perfluoropolyether group represented by

X is at least one linking group selected from among $-CH_2-$, $-CH_2O-$, $-NR^3-$, $-CO_2-$, $-CONR^3-$, $-S-$, $-SO_3-$ and $-SO_2NR^3-$, $R^1$ is an alkyl group having 1 to 4 carbon atoms, $R^2$ is an alkyl group having 1 to 4 carbon atoms, $R^3$ is hydrogen or an alkyl group having 1 to 8 carbon atoms, "a" is an integer of 0 to 3, "b" is an integer of 1 to 3, "c" is 0 or 1, n is an integer of 1 to 20, and m is an integer of at least 1.

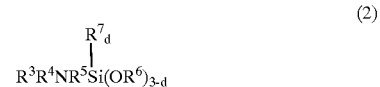

(2)

Herein $R^3$ and $R^4$ each are independently hydrogen, an alkyl group having 1 to 15 carbon atoms, or an aminoalkyl group having 1 to 15 carbon atoms, $R^5$ is a divalent hydrocarbon group having 1 to 18 carbon atoms, $R^6$ is an alkyl group having 1 to 4 carbon atoms, $R^7$ is an alkyl group having 1 to 4 carbon atoms, and "d" is 0 or 1.

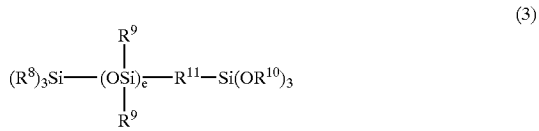

(3)

Herein $R^8$ to $R^{10}$ each are an alkyl group having 1 to 6 carbon atoms, $R^{11}$ is an oxygen atom or an alkylene group having 1 to 4 carbon atoms, and "e" is 0 to 50.

The composition is typically used in the treatment of fibrous items for imparting water and oil repellency.

Another aspect of the invention provides a method for preparing a water-soluble, water repellent, oil repellent treating composition, comprising the steps of effecting (partial) cohydrolysis on components (A) and (C) to form a (partial) cohydrolysate, and effecting condensation reaction of the (partial) cohydrolysate with component (B) to form the cohydrolytic condensation reaction product.

DESCRIPTION OF THE PREFERRED EMBODIMENT

Component (A) used herein is a fluorinated alkyl-bearing alkoxysilane of the general formula (1).

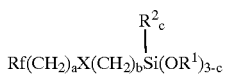

(1)

Herein Rf is a perfluoroalkyl group represented by $C_nF_{2n+1}$ wherein n is an integer of 1 to 20, preferably 1 to 12, or a perfluoropolyether group represented by

wherein m is an integer of at least 1, preferably 1 to 20. X is at least one linking group selected from among —$CH_2$—, —$CH_2O$—, —$NR^3$—, —$CO_2$—, —$CONR^3$—, —S—, —$SO_3$— and —$SO_2NR^3$—, wherein $R^3$ is hydrogen or an alkyl group having 1 to 8 carbon atoms. $R^1$ is an alkyl group having 1 to 4 carbon atoms, $R^2$ is an alkyl group having 1 to 4 carbon atoms, the subscript "a" is an integer of 0 to 3, "b" is an integer of 1 to 3, and "c" is 0 or 1.

Rf stands for perfluoroalkyl groups which may contain at least one ether bond, of which perfluoropolyether groups are exemplified below.

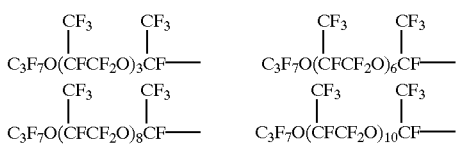

Illustrative, non-limiting, examples of the silane of formula (1) are given below.

$CF_3C_2H_4Si(OCH_3)_3$
$CF_3C_2H_4Si(OC_2H_5)_3$
$C_4F_9C_2H_4Si(OCH_3)_3$
$C_4F_9C_2H_4Si(OC_2H_5)_3$
$C_8F_{17}C_2H_4Si(OCH_3)_3$
$C_8F_{17}C_2H_4Si(OC_2H_5)_3$
$CF_3C_3H_6Si(OCH_3)_3$
$CF_3C_3H_6Si(OC_2H_5)_3$
$C_4F_9C_3H_6Si(OCH_3)_3$
$C_4F_9C_3H_6Si(OC_2H_5)_3$
$C_8F_{17}C_3H_6Si(OCH_3)_3$
$C_8F_{17}C_3H_6Si(OC_2H_5)_3$
$C_8F_{17}CONHC_2H_4Si(OCH_3)_3$
$C_8F_{17}CONHC_2H_4Si(OC_2H_5)_3$

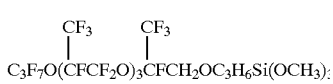

Of the above-illustrated compounds, $C_8F_{17}C_2H_4Si(OCH_3)_3$ and $C_8F_{17}C_3H_6Si(OCH_3)_3$ are especially preferred.

As component (A), a partial hydrolyzate of the silane may be used as well as the silane. The hydrolyzate must have at least one hydrolyzable group left therein. If desired, component (A) may be either a mixture of silanes or a hydrolyzate of mixed silanes.

Component (C) is an alkoxysilyl-bearing polyorganosiloxane of the following general formula (3).

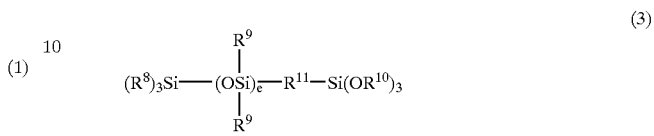

(3)

Herein $R^8$ to $R^{10}$ each are an alkyl group having 1 to 6 carbon atoms, $R^{11}$ is an oxygen atom or an alkylene group having 1 to 4 carbon atoms, and "e" is 0 to 50, preferably 5 to 20.

Illustrative, non-limiting, examples of the polyorganosiloxane of formula (3) are given below.

$(CH_3)_3SiOSi(OCH_3)_3$
$(CH_3)_3SiOSi(CH_3)_2CH_2CH_2Si(OCH_3)_3$

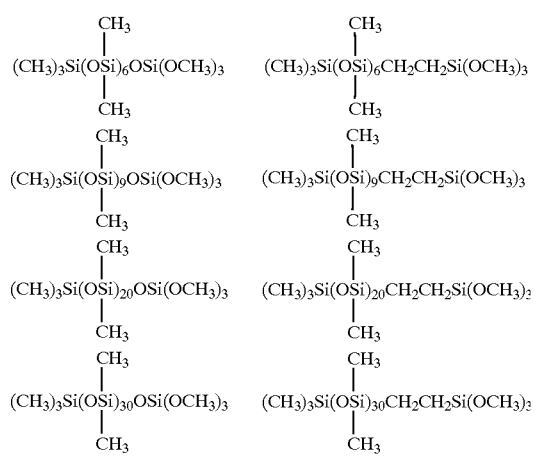

Of the above-illustrated compounds, the following is most preferred.

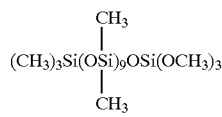

As component (C), a partial hydrolyzate of the polyorganosiloxane may be used as well as the polyorganosiloxane.

Component (B) is an amino-bearing alkoxysilane of the following general formula (2).

(2)

Herein $R^3$ and $R^4$ each are hydrogen, an alkyl group having 1 to 15 carbon atoms, especially 1 to 4 carbon atoms, or an aminoalkyl group having 1 to 15 carbon atoms, especially 1 to 4 carbon atoms, $R^3$ and $R^4$ may be the same or different; $R^5$ is a divalent hydrocarbon group having 1 to 18 carbon atoms; $R^6$ is an alkyl group having 1 to 4 carbon atoms; $R^7$ is an alkyl group having 1 to 4 carbon atoms; and "d" is 0 or 1.

Illustrative, non-limiting, examples of the amino-bearing alkoxysilane of formula (2) are given below.

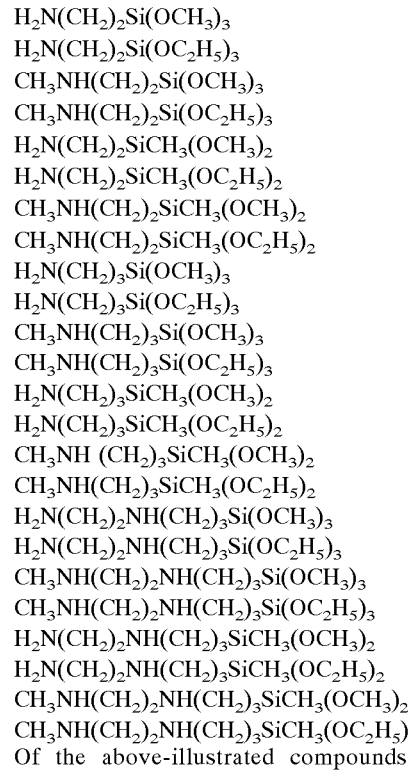

Of the above-illustrated compounds, $H_2N(CH_2)_3Si(OCH_3)_3$, $H_2N(CH_2)_3SiCH_3(OCH_3)_2$ and $H_2N(CH_2)_2NH(CH_2)_3Si(OCH_3)_3$ are most preferred.

As component (B), a partial hydrolyzate of the alkoxysilane may be used as well as the alkoxysilane.

The water-soluble, water/oil repellent treating composition of the invention is defined as comprising the cohydrolytic condensation reaction product of the above-described components (A), (B) and (C) as a main ingredient, the reaction product being dissolved in water.

The reaction product of components (A), (B) and (C) can be obtained by subjecting components (A), (B) and (C) to cohydrolytic condensation, preferably in the presence of an organic or inorganic acid. It is preferred from the stability standpoint to obtain the reaction product by first effecting partial cohydrolysis on components (A) and (C) in the presence of an organic or inorganic acid to form a partial cohydrolysate, and effecting condensation reaction of the partial cohydrolysate with component (B).

Examples of the organic and inorganic acids which are used upon cohydrolysis of components (A) and (C) include hydrochloric acid, sulfuric acid, methanesulfonic acid, formic acid, acetic acid, propionic acid, citric acid, palmitic acid, stearic acid, oleic acid, malonic acid, succinic acid, glutaric acid, oxalic acid, and maleic acid, alone or in admixture of any. Of these, acetic acid and propionic acid are especially preferred. An appropriate amount of the acid used is about 5 to 400 parts, especially about 10 to 350 parts by weight per 100 parts by weight of components (A) and (C) combined. With less than 5 parts of the acid, hydrolysis may proceed slowly and the cohydrolyzate may become less stable in aqueous solution form. Preferably the amount of the acid catalyst is adjusted so as to form a solution at pH 7 to 3 when dissolved in water.

Cohydrolysis is preferably carried out in a diluted form with a solvent. Suitable solvents are alcohol solvents such as methanol, ethanol, 1-propanol, 2-propanol, 1-butanol, 2-butanol, 3-butanol and 2-methyl-2-butanol, with 3-butanol being most preferred. An appropriate amount of the solvent used is about 100 to 500 parts, especially about 200 to 400 parts by weight per 100 parts by weight of components (A) and (C) combined. Less than 100 parts of the solvent may allow condensation to proceed whereas more than 500 parts of the solvent may require an extra time for hydrolysis.

The molar amount of water added for cohydrolysis of components (A) and (C) is 1 to 3 times, especially 1.25 to 2.5 times the molar amount of components (A) and (C) combined. If the molar amount of water is less than the molar amount of components (A) and (C) combined, more alkoxy groups may be left. If the molar amount of water is more than 3 times, condensation may take place to an excessive extent.

Preferred reaction conditions for cohydrolysis of components (A) and (C) include a temperature of about 10 to 100° C., preferably about 60 to 90° C. and a time of about 1 to 3 hours.

With respect to the mixing proportion, 100 parts by weight of component (A) is preferably mixed with 0.1 to 10 parts, especially 0.5 to 3 parts by weight of component (C). Less than 0.1 part of component (C) may adversely affect durability and softness whereas more than 10 parts of component (C) may adversely affect water solubility and oil repellency.

Upon cohydrolysis of components (A) and (C), the molar ratio of component (A) to (C) is preferably set between 1:0.001 and 1:0.1, especially between 1:0.01 and 1:0.05 although this ratio varies depending on the particular structures of components (A) and (C).

The reaction product obtained by cohydrolysis of components (A) and (C) is then continuously subjected to condensation reaction with component (B). In this step, component (B) is reacted in such an amount that the molar ratio of the total of components (A) and (C) to component (B) may fall between 1:0.5 and 1:20, especially between 1:1 and 1:10. If the molar ratio of component (B) is less than 0.5, water solubility may be adversely affected. If the molar ratio of component (B) is more than 20, water repellency may be adversely affected and fibers treated become markedly discolored.

Preferred reaction conditions for condensation of component (B) include a temperature of about 60 to 100° C. and a time of about 1 to 3 hours.

In the water-soluble, water/oil repellent treating composition of the invention, the reaction product of components (A) to (C) is present as a main or active ingredient. On use, the reaction product is preferably diluted with water such that the concentration of the reaction product is 0.1 to 10%, especially 1 to 3% by weight, that is, the concentration of water is 99.9 to 90%, especially 99 to 97% by weight. If the concentration of water exceeds 99.9% by weight, the composition may fail to exert its essential performance and a large amount thereof may have to be applied. If the concentration of water less than 90% by weight, storage stability may be deteriorated.

To the water-soluble, water/oil repellent treating composition, an amino-modified silicone emulsion or an epoxy-modified silicone emulsion or both may be added for the purpose of imparting softness and improving hand. While it is known to apply an amino- or epoxy-modified silicone emulsion to fibers for softness and hand improvements, the addition of such an emulsion to the water-soluble, water/oil repellent treating composition of the invention can also achieve softness and hand improvements. An appropriate amount of the amino- or epoxy-modified silicone emulsion is 0 to 200 parts, especially 50 to 100 parts by weight per 100 parts by weight of the reaction product of components (A), (B) and (C). More than 200 parts of the amino- or epoxy-modified silicone emulsion is undesirable because such a large amount improves softness, but adversely affects water/oil repellency.

Further, well-known additives such as surfactants and alcohols may be added for improving the stability of the aqueous solution insofar as this does not compromise the benefits of the invention. Curing catalysts based on metals such as Al, Sn and Zn may also be added if desired.

The water-soluble, water/oil repellent treating composition thus obtained can impart satisfactory water/oil repellency and softness to items of natural or synthetic fibers, textiles, lather and paper through a simple process, for example, by applying the composition to the item in a conventional manner as by dipping or spray coating, followed by drying. The composition is especially effective to apply to fibrous items although it is also applicable to other substrates such as glass, metals and plastics.

The water-soluble, water/oil repellent treating composition of the invention has improved water solubility and shelf stability because the fluorinated alkyl-bearing silane compound serving as a main component thereof is endowed with water solubility. The composition is aqueous and therefore, has no detrimental effects on the environment, and it imparts fully durable water repellency and good softness and hand. According to the inventive method, the reaction product serving as the main ingredient can be produced in a consistent manner.

EXAMPLE

Examples of the invention are given below by way of illustration and not by way of limitation.

Synthesis Example 1 (used in Example 1)

A 1-liter four-necked flask equipped with a stirrer, condenser, thermometer and dropping funnel was charged with 49.5 g (0.087 mol) of $C_8F_{17}(CH_2)_2Si(OCH_3)_3$, 1.0 g (0.0010 mol) of $(CH_3)_3SiO(Si(CH_3)_2O)_9Si(OCH_3)_3$, 171.2 g of 3-butanol, 8.7 g (0.145 mol) of acetic acid and 2.6 g (0.14 mol) of water, which were stirred and heated until 3-butanol started refluxing. Reaction was continued at the temperature for 2 hours, after which 17.2 g (0.0096 mol) of $NH_2(CH_2)_3Si(OCH_3)_3$ was added dropwise from the dropping funnel. Under refluxing of 3-butanol, reaction was continued for one hour, yielding a colorless clear solution.

Synthesis Example 2 (used in Example 2)

A colorless clear solution was obtained by repeating the reaction procedure of Synthesis Example 1 except that the amount of $(CH_3)_3SiO(Si(CH_3)_2O)_9Si(OCH_3)_3$ was changed from 1.0 g to 1.5 g (0.0017 mol).

Synthesis Example 3 (used in Example 3)

The solution obtained in Synthesis Example 1 was diluted with water to form an aqueous solution containing 2% by weight of the active ingredient. An amino-modified silicone emulsion Polon MF-14EC (Shin-Etsu Chemical Co., Ltd.) was diluted with water to form an aqueous solution containing 2% by weight of the active ingredient. 100 g of the former solution and 100 g of the latter solution were combined and stirred at room temperature for 10 minutes, obtaining 195 g of an aqueous solution containing 2% by weight of the active ingredients which looked colorless and faintly turbid.

Synthesis Example 4 (Comparison)

A 1-liter four-necked flask equipped with a stirrer, condenser, thermometer and dropping funnel was charged with 115 g (0.202 mol) of $C_8F_{17}(CH_2)_2Si(OCH_3)_3$, 2.4 g (0.020 mol) of $(CH_3)_2Si(OCH_3)_2$, 400 g of 3-butanol, 12.2 g (0.202 mol) of acetic acid and 5.4 g (0.3 mol) of water, which were stirred and heated until 3-butanol started refluxing. Reaction was continued at the temperature for 2 hours, after which 36.2 g (0.202 mol) of $NH_2(CH_2)_3Si(OCH_3)_3$ was added dropwise from the dropping funnel. Under refluxing of 3-butanol, reaction was continued for one hour, after which 47.6 g (0.202 mol) of γ-glycidoxypropyltrimethoxysilane was added dropwise from the dropping funnel. Under refluxing of 3-butanol, reaction was continued for one hour, yielding a pale yellow clear solution.

Examples 1–3

Comparative Example

Water-soluble fiber treating compositions (Examples 1, 2, 3 and Comparative Example) were prepared by diluting the products of Synthesis Examples 1 to 4 so as to give an active ingredient concentration of 2% by weight, respectively. These water-soluble fiber treating compositions were allowed to stand for one month at room temperature, and they remained unchanged.

Each of these treating compositions was sprayed to pieces of polyester fiber taffeta, nylon taffeta and cotton broadcloth and air dried for one day. On the treated samples, a spray type water repellent test and an oil repellent test were carried out. Contact angle with water and hexadecane were measured. The treated samples were further examined for hand. The results are shown in Tables 1 to 4.

Water Repellent Test

According to the spray method of JIS L 1092 (1986), water was sprayed to the surface of the treated sample. Water repellency was rated from the surface state.

| Point | Surface state |
|---|---|
| 0 | Surface and undersurface were entirely wetted |
| 5 | only surface was entirely wetted |
| 70 | half of surface was wetted, discrete water droplets penetrated the fabric |
| 80 | surface was wetted with discrete water droplets |
| 90 | no surface wetting was observed, but water droplets adhered |
| 100 | no surface wetting, no water droplets adhered |

Oil Repellent Test

According to AATCC Test Method 118 (1966), drops with a diameter of about 4 mm of liquid hydrocarbons having different surface tensions (ST) were placed on the surface of the treated sample at three positions, using a dropping pipette. Oil repellency was rated from the penetrated state after 30 seconds.

| Oil repellency | Penetrated state |
|---|---|
| 8 | n-heptane (ST 20.0 dyn/cm) did not penetrate |
| 7 | n-octane (ST 21.8 dyn/cm) did not penetrate |
| 6 | n-decane (ST 23.5 dyn/cm) did not penetrate |

-continued

| Oil repellency | Penetrated state |
|---|---|
| 5 | n-dodecane (ST 25.0 dyn/cm) did not penetrate |
| 4 | n-tetradecane (ST 26.7 dyn/cm) did not penetrate |
| 3 | n-hexadecane (ST 27.3 dyn/cm) did not penetrate |
| 2 | n-hexadecane/nujol 35/65 (wt %) mixture (ST 29.6 dyn/cm) did not penetrate |
| 1 | nujol (ST 31.2 dyn/cm) did not penetrate |
| 0 | below oil repellency 1 |

Contact Angle Measurement

Contact angle with water and hexadecane were measured. Measurement was done at five different positions on the sample surface. An average of three measurements with maximum and minimum values omitted is reported.

Hand Test

A panel of five persons touched the treated fabric with fingers and judged the hand according to the following criterion.

Good: equal hand to untreated fabric

Fair: somewhat harder hand than untreated fabric

Hard: harder hand than untreated fabric

TABLE 1

| | Water repellency | | |
|---|---|---|---|
| | Polyester fiber taffeta | Nylon taffeta | Cotton broadcloth |
| Example 1 | 100 | 100 | 100 |
| Example 2 | 100 | 100 | 100 |
| Example 3 | 100 | 100 | 100 |
| Comparative Example | 100 | 100 | 100 |

TABLE 2

| | Oil repellency | | |
|---|---|---|---|
| | Polyester fiber taffeta | Nylon taffeta | Cotton broadcloth |
| Example 1 | 6 | 5 | 6 |
| Example 2 | 5 | 5 | 6 |
| Example 3 | 5 | 5 | 5 |
| Comparative Example | 5 | 5 | 7 |

TABLE 3

| | Contact angle with water | | | Contact angle with hexadecane | | |
|---|---|---|---|---|---|---|
| | Polyester fiber taffeta | Nylon taffeta | Cotton broadcloth | Polyester fiber taffeta | Nylon taffeta | Cotton broadcloth |
| Example 1 | 124° | 125° | 141° | 95° | 88° | 115° |
| Example 2 | 126° | 120° | 143° | 88° | 85° | 110° |
| Example 3 | 118° | 120° | 123° | 85° | 83° | 108° |
| Comparative Example | 125° | 123° | 147° | 90° | 89° | 120° |

TABLE 4

| | Hand | | |
|---|---|---|---|
| | Polyester fiber taffeta | Nylon taffeta | Cotton broadcloth |
| Example 1 | Good | Good | Fair |
| Example 2 | Good | Good | Good |
| Example 3 | Good | Good | Good |
| Comparative Example | Hard | Hard | Hard |

Additionally, each of the treating solutions was sprayed to a piece of polyester fiber taffeta, and dried by heating at 100° C. for 2 minutes and at 150° C. for a further 2 minutes. The thus treated fabric was examined for durability of water repellency by the following test. The results are shown in Table 5.

Durability of Water Repellency Test

The treated fabric was placed in a wash bath containing 5 g of sodium alkylbenzenesulfonate and 2 g of sodium carbonate per liter of water. A household washing machine was operated at a bath ratio of 1:100, the fabric was washed for 15 minutes at a water temperature of 50° C. The spray type water repellent test was carried out on the washed fabric.

TABLE 5

| | Drying after spraying | Number of washing cycles | | | | | |
|---|---|---|---|---|---|---|---|
| | | 0 | 1 | 2 | 3 | 4 | 5 |
| Example 1 | Air drying | 100 | 100 | 100 | 100 | 100 | 100 |
| | Heat drying | 100 | 100 | 100 | 100 | 100 | 100 |
| Example 2 | Air drying | 100 | 100 | 100 | 100 | 100 | 100 |
| | Heat drying | 100 | 100 | 100 | 100 | 100 | 100 |
| Example 3 | Air drying | 100 | 100 | 100 | 100 | 100 | 100 |
| | Heat drying | 100 | 100 | 100 | 100 | 100 | 100 |
| Comparative Example | Air drying | 100 | 100 | 100 | 100 | 100 | 100 |
| | Heat drying | 100 | 100 | 100 | 100 | 100 | 100 |

Japanese Patent Application No. 2000-390204 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A water-soluble, water/oil repellent treating composition comprising the reaction product obtained by cohydrolysis and condensation of (A) a fluorinated alkyl-bearing alkoxysilane of the following general formula (1) or a partial hydrolyzate thereof or both,

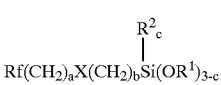

(1)

wherein Rf is a perfluoroalkyl group represented by $C_nF_{2n+1}$ or a perfluoropolyether group represented by

X is at least one linking group selected from the group consisting of —$CH_2$—, —$CH_2O$—, —$NR^3$—, —$CO_2$—, —$CONR^3$—, —S—, —$SO_3$— and —$SO_2NR^3$—, $R^1$ is an alkyl group having 1 to 4 carbon atoms, $R^2$ is an alkyl group having 1 to 4 carbon atoms, $R^3$ is hydrogen or an alkyl group having 1 to 8 carbon atoms, "a" is an integer of 0 to 3, "b" is an integer of 1 to 3, "c" is 0 or 1, n is an integer of 1 to 20, and m is an integer of at least 1, (B) an amino-bearing alkoxysilane of the following general formula (2) or a partial hydrolyzate thereof or both,

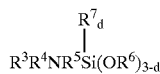
(2)

wherein $R^3$ and $R^4$ each are independently hydrogen, an alkyl group having 1 to 15 carbon atoms, or an aminoalkyl group having 1 to 15 carbon atoms, $R^5$ is a divalent hydrocarbon group having 1 to 18 carbon atoms, $R^6$ is an alkyl group having 1 to 4 carbon atoms, $R^7$ is an alkyl group having 1 to 4 carbon atoms, and "d" is 0 or 1, and (C) an alkoxysilyl-bearing polyorganosiloxane of the following general formula (3) or a partial hydrolyzate thereof or both,

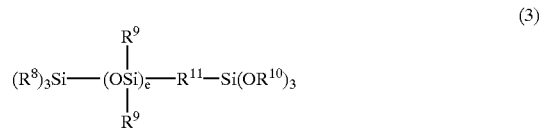
(3)

wherein $R^8$ to $R^{10}$ each are an alkyl group having 1 to 6 carbon atoms, $R^{11}$ is an oxygen atom or an alkylene group having 1 to 4 carbon atoms, and "e" is 0 to 50, the reaction product being dissolved in water.

2. The composition of claim 1, further comprising an amino-modified silicone emulsion or an epoxy-modified silicone emulsion or both.

3. A method for treating a fibrous item to impart water and oil repellency, comprising treating said fibrous item with the composition of claim 1.

4. A method for preparing a water-soluble, water/oil repellent treating composition, said method comprising the steps of effecting (partial) cohydrolysis on components (A) and (C) to form a (partial) cohydrolysate, and effecting condensation reaction of the (partial) cohydrolysate with component (B) to form the cohydrolytic condensation reaction product of claim 1.

* * * * *